(12) United States Patent
Hao

(10) Patent No.: US 11,937,994 B2
(45) Date of Patent: Mar. 26, 2024

(54) METHOD FOR GENERATING A DIGITAL DATA SET REPRESENTING A TARGET TOOTH ARRANGEMENT

(71) Applicant: NINGBO SHENLAI MEDICAL TECHNOLOGY CO., LTD., Ningbo (CN)

(72) Inventor: Jin Hao, Chengdu (CN)

(73) Assignee: NINGBO SHENLAI MEDICAL TECHNOLOGY CO., LTD., Ningbo (CN)

( * ) Notice: Subject to any disclaimer, the term of this patent is extended or adjusted under 35 U.S.C. 154(b) by 348 days.

(21) Appl. No.: 17/474,045

(22) Filed: Sep. 13, 2021

(65) Prior Publication Data

US 2023/0083119 A1    Mar. 16, 2023

(51) Int. Cl.
*A61C 9/00* (2006.01)
*A61C 7/00* (2006.01)
*A61C 13/34* (2006.01)
*A61C 19/05* (2006.01)

(52) U.S. Cl.
CPC .............. *A61C 9/004* (2013.01); *A61C 7/002* (2013.01); *A61C 13/34* (2013.01); *A61C 19/05* (2013.01)

(58) Field of Classification Search
CPC ......... A61C 9/004; A61C 7/002; A61C 13/34; A61C 19/05; G06T 2207/30036; G06T 7/33

See application file for complete search history.

(56) References Cited

U.S. PATENT DOCUMENTS

2021/0125095 A1 *   4/2021   Sakuma ................. G06F 17/16

OTHER PUBLICATIONS

Buchaillard et al., "3D statistical models for tooth surface reconstruction", Computers in Biology and Medicine 37 (2007) 1461-1471 (Year: 2007).*
Cui et al., "TSegNet: An efficient and accurate tooth segmentation network on 3D dental model", Medical Image Analysis 69 (2021) 101949 (Year: 2021).*

* cited by examiner

*Primary Examiner* — Qian Yang
(74) *Attorney, Agent, or Firm* — Birch, Stewart, Kolasch & Birch, LLP

(57) ABSTRACT

In one aspect, the present application provides a computer-implemented method for generating a digital data set representing a target tooth arrangement, comprising: obtaining a first 3D digital model representing an initial tooth arrangement; extracting at least one feature from each tooth of the first 3D digital model; generating a feature vector based on the extracted features; and aligning the first 3D digital model using a Statistical Shape Model based on the feature vector to obtain a second 3D digital model representing a target tooth arrangement.

8 Claims, 2 Drawing Sheets

100 a first 3D digital model representing an initial tooth arrangement is obtained — 101 a feature vector is extracted from the first 3D digital model — 103 a data set representing a target tooth arrangement is generated based on the feature vector using a SSM — 105

FIG. 1

METHOD FOR GENERATING A DIGITAL DATA SET REPRESENTING A TARGET TOOTH ARRANGEMENT

FIELD OF THE APPLICATION

The present application generally relates to a method for generating a digital data set representing a target tooth arrangement.

BACKGROUND

Shell-shaped repositioners made of polymer materials become more and more popular due to their advantages on aesthetic appearance, convenience and hygiene. A set of shell-shaped repositioners usually includes a dozen of or even tens of successive shell-shaped repositioners for incrementally repositioning a patient's teeth from an initial tooth arrangement to a target tooth arrangement, where there are N successive intermediate tooth arrangements from a first intermediate tooth arrangement to a final intermediate tooth arrangement between the initial tooth arrangement and the target tooth arrangement.

A common method for fabricating shell-shaped repositioners is forming a series of successive shell-shaped repositioners over a series of successive positive models respectively using a thermoforming process. The series of successive positive models are fabricated based on a series of successive 3D digital models, respectively, which are generated based on a series of successive digital data sets representing a series of successive tooth arrangements from the first intermediate tooth arrangement to the target tooth arrangement, respectively.

A common method of obtaining the series of successive digital data sets includes: first, obtain a 3D digital model representing the initial tooth arrangement (i.e. the patient's tooth arrangement before the orthodontic treatment) by scanning, then obtain a 3D digital model representing the target tooth arrangement (i.e. the tooth arrangement to be achieved by the orthodontic treatment) by manually manipulating the 3D digital model representing the initial tooth arrangement, and then generate the series of successive intermediate tooth arrangements by interpolating based on the initial and the target tooth arrangements.

However, it is time-consuming and laborious to obtain a 3D digital model representing a target tooth arrangement by manually manipulating a 3D digital model representing an initial tooth arrangement, and it is subject to and strongly dependent on the operator's skill, as a result, it is difficult to ensure the consistency of results. In view of the above, it is necessary to provide a computer-implemented method for generating a digital data set representing a target tooth arrangement.

SUMMARY

In one aspect, the present application provides a computer-implemented method for generating a digital data set representing a target tooth arrangement, comprising: obtaining a first 3D digital model representing an initial tooth arrangement; extracting at least one feature from each tooth of the first 3D digital model; generating a feature vector based on the extracted features; and aligning the first 3D digital model using a Statistical Shape Model based on the feature vector to obtain a second 3D digital model representing a target tooth arrangement.

In some embodiments, the at least one feature includes 3D coordinates of at least one feature point.

In some embodiments, the first 3D digital model represents upper jaw teeth and lower jaw teeth under the initial tooth arrangement, where the upper jaw teeth and the lower jaw teeth are in a predetermined relative positional relationship.

In some embodiments, the predetermined relative position relationship is occlusal state.

In some embodiments, the at least one feature point includes centroid of each tooth.

In some embodiments, the Statistical Shape Model is created based on a plurality of 3D digital models, each of which represents a target tooth arrangement.

In some embodiments, only eigenvectors with eigenvalues, whose absolute values are greater than a predetermined value, are kept in the creation of the Statistical Shape Model.

In some embodiments, the computer-implemented method for generating a digital data set representing a target tooth arrangement may further comprise: generating new 3D coordinates for the identified feature points using the Statistical Shape Model based on the feature vector; generating a transformation matrix based on the new coordinates and original coordinates of the feature points; and transforming the first 3D digital model using the transformation matrix to obtain the second 3D digital model.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are not necessarily drawn to scale, and like reference numbers therein denote like components.

FIG. 1 is a schematic flowchart of a computer-implemented method for generating a digital data set representing a target tooth arrangement;

DETAILED DESCRIPTION OF ILLUSTRATED EMBODIMENTS

Figure 2A:
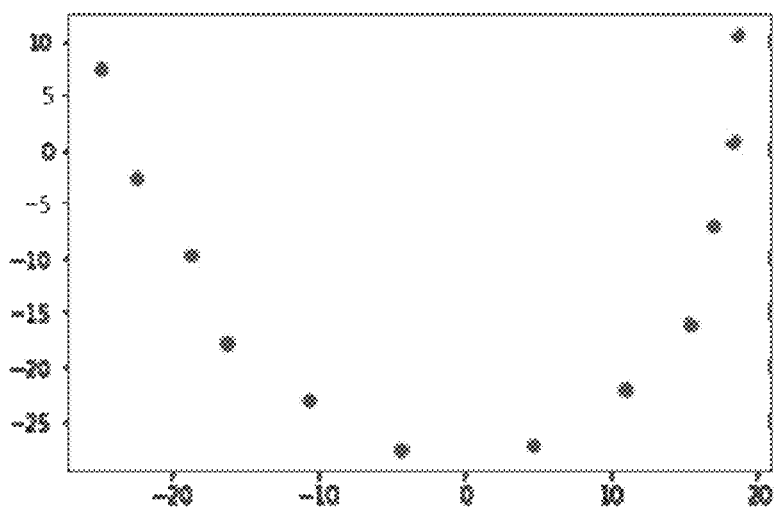
FIG. 2A schematically illustrates distribution of centroids of unaligned upper jaw teeth in one example.

In the following detailed depiction, reference is made to the accompany drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

A Statistical Shape Model (hereinafter "SSM") is a geometric model that describe a collection of semantically similar objects in a very compact way. An SSM represents an average shape of many three-dimensional or two-dimensional objects as well as their variation in shape. The creation of an SSM requires a correspondence mapping of features among shape samples, which can be achieved, e.g., by parameterization with a respective sampling. If a corresponding parameterization over all shapes can be established, variation between individual shape characteristics can be mathematically investigated.

In one aspect, the present application provides a method for aligning a 3D digital model of teeth using SSM, in other words, generating a digital data set representing a target tooth arrangement.

In one embodiment, a digital data set representing a target tooth arrangement may be a set of coordinates of teeth under the target tooth arrangement. In another embodiments, a digital data set representing a target tooth arrangement may be a 3D digital model of teeth under the target tooth arrangement.

Dental orthodontic treatment is a process of repositioning teeth from an initial tooth arrangement to a target tooth arrangement. It is understood that a target tooth arrangement is a tooth arrangement to be achieved by an orthodontic treatment; an initial tooth arrangement may be a patient's tooth arrangement before orthodontic treatment, or a patient's current tooth arrangement based on which a target tooth arrangement is generated.

FIG. 1 shows a schematic flowchart of a computer-implemented method 100 for generating a digital data set representing a target tooth arrangement in one embodiment of the present application.

In 101, a first 3D digital model representing an initial tooth arrangement is obtained.

The one embodiment, the first 3D digital model of teeth may be 3D digital model of upper jaw teeth, or lower jaw teeth, or upper jaw teeth and lower jaw teeth.

In one embodiment, a 3D digital model of teeth on a jaw under an initial tooth arrangement may be obtained by directly scanning a patient's jaw. In another embodiment, a 3D digital model of teeth under an initial tooth arrangement may be obtained by scanning a mockup of a patient's jaw such as a plaster model. In a further embodiment, a 3D digital model of teeth under an initial tooth arrangement may be obtained by scanning an impression of a patient's jaw.

In one embodiment, after a 3D digital model of teeth under an initial tooth arrangement is obtained, it is segmented such that the teeth in the 3D digital model are independent of each other so that each tooth in the 3D digital model may be moved/manipulated individually.

In 103, a feature vector is extracted from the first 3D digital model.

In one embodiment, one feature point may be identified on each tooth of the first 3D digital model. In one embodiment, the centroid of a tooth may be taken as its feature point. Inspired by the present application, it is understood that besides centroid, any other suitable point of a tooth may be taken as its feature point, for example, center of the top surface.

Then 3D coordinates of the centroids are encoded into a feature vector representing the first digital model. If there is no missing tooth, a human being usually has 32 teeth, with 16 teeth on each of the upper and lower jaws. In such case, the feature vector is a 96 (3*32=96) dimensional vector.

In another embodiment, two or more feature points may be identified on each tooth of the first 3D digital model. In another embodiment, numbers and/or types of feature points identified on different teeth may be different, for example, two feature points may be identified on each incisor, and three feature points may be identified on each molar. The number and types of feature points to be identified on each tooth are dependent on the SSM used to align the teeth of the first 3D digital model.

Inspired by the present application, it is understood that besides 3D coordinates of feature points, any other suitable feature may be used to generate a feature vector, for example, vectors such as normal and curvature etc. In general, a feature vector may be generated based on any suitable feature or any combination of suitable features.

In 105, a data set representing a target tooth arrangement is generated based on the feature vector using an SSM.

An SSM is created based on a plurality of 3D digital models of aligned teeth, in other words, the teeth of each of the plurality of 3D digital models are under a target tooth arrangement. In short, the creation of the SSM is a process of learning a shape distribution of the plurality of 3D digital models of aligned teeth. Aligning the teeth of the first 3D digital model using the SSM is basically mapping the shape of the first 3D digital model onto the shape distribution to find a most similar shape.

It is understood that if an SSM is for aligning upper jaw teeth, then it is created based on a plurality of 3D digital models of aligned upper jaw teeth; if an SSM is for aligning lower jaw teeth, then it is created based on a plurality of 3D digital models of aligned lower jaw teeth; if an SSM is for aligning upper jaw and lower jaw teeth, then it is created based on a plurality of 3D digital models of aligned upper jaw and lower jaw teeth.

An SSM for aligning upper jaw and lower jaw teeth takes relative position relationships between upper jaw teeth and lower jaw teeth into consideration in generation of a digital data set representing a target tooth arrangement, and relative positional relationships between the upper jaw teeth and the lower jaw teeth under a resultant target tooth arrangement are more ideal. In this case, in each of the 3D digital models used to train the SSM and the first 3D digital model, the upper jaw teeth and the lower jaw teeth are in a predetermined relative positional relationship. In one embodiment, the predetermined relative positional relationship may be occlusal state (upper jaw teeth and lower jaw teeth are closed). Inspired by the present application, it is understood that besides occlusal state, the predetermined relative positional relationship may be any other suitable relative positional relationships, for example, a positional relationship obtained by moving one of the two jaws, which are in occlusal state, from the other by a predetermined distance toward a predetermined direction.

Creation of an SSM according to one embodiment is briefly described below.

First, a plurality of 3D digital models of aligned teeth are obtained. These 3D digital models might be generated by different systems, and they might not be aligned. Since any variation that is not supposed to be modeled needs to be removed prior to model construction, these 3D digital models are aligned in a same coordinate system before they are used to train the SSM.

Then, similar with the first 3D digital model, for each of the plurality of 3D digital models, centroid of each tooth is identified as its feature point, then coordinates of these centroids are encoded into a feature vector of the 3D digital model.

After that, a mean shape is calculated based on the feature vectors. In one embodiment, the average of the feature vectors may be taken as the mean shape. In another embodiment, the mean shape may be generated by performing Procrustes Analysis on the feature vectors.

In addition, eigenvectors and corresponding eigenvalues are calculated based on the feature vectors, where the eigenvectors and corresponding eigenvalues describe variation of shapes. In one embodiment, a matrix is constructed based on the feature vectors, where each row of the matrix corresponds to a feature vector. In one embodiment, Singular Value Decomposition (hereinafter "SVD") may be used to process the matrix to generate the eigenvectors and corresponding eigenvalues. By performing SVD, a series of eigenvectors and their corresponding eigenvalues are generated, where each eigenvalue is a factor by which its corresponding eigenvector is scaled. Then the eigenvectors are sorted by absolute values of their eigenvalues, and top eigenvectors which describes most changes are selected, and the rest eigenvectors are deleted. In one embodiment, eigenvectors with eigenvalues, whose absolute values are greater than a predetermined value, may be selected. The selected eigenvectors and their eigenvalues can be used to describe the variation of the shapes.

In another embodiment, Principal Component Analysis (hereinafter "PCA") may be used to process the matrix to extract the variation.

After the mean shape and the variation are obtained, the SSM is constructed and ready for use. As mentioned above that aligning the teeth of the first 3D digital model is basically mapping its shape onto the shape distribution of the SSM to find a most similar shape, and this may be carried out using regression according to below Equation (1) according to one embodiment.

$$Y = \text{meanshape} + \sum_{i=0}^{N} w_i \times \text{eigenvector}_i \quad \text{Equation (1)}$$

where, Y stands for the feature vector of the first 3D digital model, N stands for the total number of the selected eigenvectors, i stands for the number of a corresponding eigenvector, $w_i$ the coefficient of eigenvector #i which needs to be calculated.

$w_i$ can be calculated using common methods for solving regression problems, in one embodiment, it can be calculated according to below Equation (2):

$$w_i = \text{eigenvector}_i \cdot T \times (Y - \text{meanshape}) \quad \text{Equation (2)}$$

where, T stands for transpose operation.

In one embodiment, $w_i$ may be limited within below range:

$$-3\sqrt{\lambda_i} \leq w_i \leq 3\sqrt{\lambda_i}$$

where, $\lambda_i$ stands for the eigenvalue corresponding to eigenvector #i. By limiting the range of $w_i$, it prevents significant deviation of any predicted shape from the mean shape.

Then the calculated $w_0 \sim w_N$ are substituted into Equation (1) to calculate a feature vector of aligned first 3D digital model. Based on the calculated feature vector, coordinates of centroids of the aligned teeth (under a target tooth arrangement) of the first 3D digital model can be obtained. After that, a transformation matrix may be calculated based on the coordinates of centroids of the unaligned teeth and the coordinates of centroids of the aligned teeth. A second 3D digital model representing a target tooth arrangement can be obtained by applying the transformation matrix on the first 3D digital model.

Figure 2B:
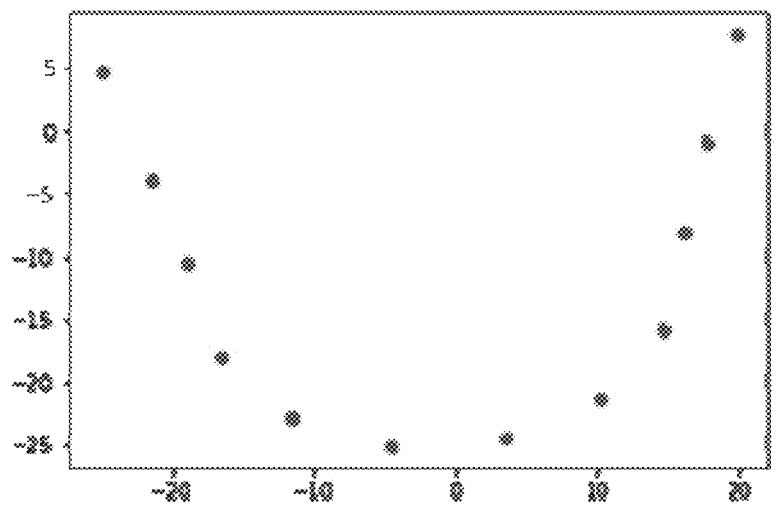
FIG. 2B schematically illustrates distribution of centroids shown in FIG. 2A after the upper jaw teeth are aligned using the method according to one embodiment.

FIG. 2A illustrates distribution of centroids of unaligned upper jaw teeth according to one example. FIG. 2B illustrates distribution of the centroids shown in FIG. 2A after the upper jaw teeth are aligned using the method of the present application.

In case there is a missing tooth in the first 3D digital model, a corresponding part of its feature vector may be given the value "not available" (hereinafter "NA"). NA will be ignored in any calculation, and result of any calculation involving NA will be NA. As a result, for a missing tooth, the corresponding part of the feature vector is NA, and the corresponding part of the calculated wi will be NA, therefore the corresponding part of the calculated Y will be NA.

It is understood that if only one feature point is identified on each tooth, a transformation matrix generated by the method of the present application only includes translation(s); if two or more feature points are identified on a tooth, a transformation matrix could include both translation(s) and rotation(s).

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

I claim:

1. A computer-implemented method for generating a digital data set representing a target tooth arrangement, comprising:

obtaining a first 3D digital model representing an initial tooth arrangement including an initial relative positional relationship between a plurality of teeth of a patient;

extracting at least one feature from each tooth of the first 3D digital model;

generating a feature vector based on the extracted features; and aligning the first 3D digital model using a Statistical Shape Model based on the feature vector to obtain a second 3D digital model representing a target tooth arrangement including a target relative positional relationship between the plurality of teeth, wherein the target relative positional relationship between the plurality of teeth is different from the initial relative positional relationship between the plurality of teeth by adjustments in spatial relationships of individual teeth, and wherein the target tooth arrangement is to be achieved by an orthodontic treatment.

2. The method of claim 1, wherein the at least one feature includes 3D coordinates of at least one feature point.

3. The method of claim 2, wherein the at least one feature point includes centroid of each tooth.

4. The method of claim 2, further comprising:
generating new 3D coordinates for the identified feature points using the Statistical Shape Model based on the feature vector;
generating a transformation matrix based on the new coordinates and original coordinates of the feature points; and
transforming the first 3D digital model using the transformation matrix to obtain the second 3D digital model.

5. The method of claim 1, wherein the first 3D digital model represents upper jaw teeth and lower jaw teeth under the initial tooth arrangement, where the upper jaw teeth and the lower jaw teeth are in a predetermined relative positional relationship.

6. The method of claim 1, wherein the predetermined relative position relationship is occlusal state.

7. The method of claim 1, wherein the Statistical Shape Model is created based on a plurality of 3D digital models, each of which represents a target tooth arrangement.

8. The method of claim 7, wherein only eigenvectors with eigenvalues, whose absolute values are greater than a predetermined value, are kept in the creation of the Statistical Shape Model.

* * * * *